C. STONER.
Wagon-Brake
No. 5,264.          Patented Aug. 28, 1847.
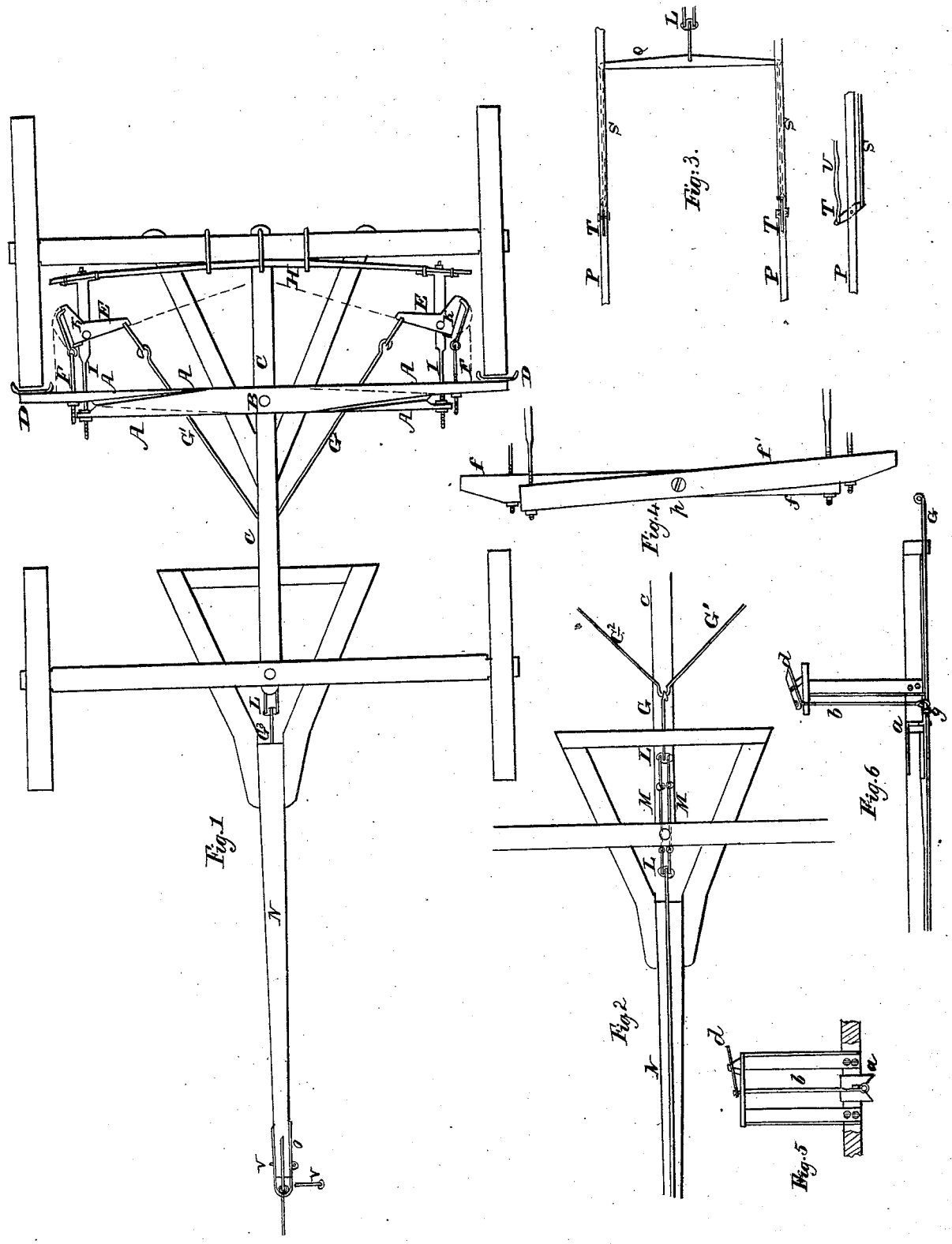

UNITED STATES PATENT OFFICE.

CHRISTIAN STONER, OF GETTYSBURGH, PENNSYLVANIA.

APPARATUS FOR OPERATING CARRIAGE-BRAKES.

Specification of Letters Patent No. 5,264, dated August 28, 1847.

*To all whom it may concern:*

Be it known that I, CHRISTIAN STONER, of the town of Gettysburgh, in the county of Adams and State of Pennsylvania, have invented a new and useful apparatus to be attached to wheeled carriages for retarding the motion of the same in descending hills, called "Stoner's self-acting brake," as hereafter described, reference being had to the annexed drawings of the same, making part of this specification.

Figure 1 is a plan of the apparatus. Fig. 2 is a sectional view of ditto.

The nature of my invention and improvement consists in so modifying and applying E. Slifer's apparatus for the above named purpose, patented in 1826, so as to render it practicable and useful for the purpose intended, and imparting to the apparatus, by means of a peculiar mode of combining and arranging the several parts, a quality not heretofore possessed by it, or any other apparatus, for retarding the motion of wheeled carriages—namely, that of causing the levers and spring to act simultaneously in drawing the rubbers against the peripheries of the wheels, whilst the carriage is moving forward by its momentum and gravity at a greater speed than that of the horses; and to throw the rubbers from the wheels when the motion of the carriage has become reduced. Also in keeping the central connecting rod extending from the lever at the end of the pole to the branches that connect with the L shaped levers parallel with the center of the pole and perch during the operation of turning the carriage.

In my apparatus I do not make use of a sliding bar for holding the rubbers that act against the wheel, as is generally used; but I substitute therefor two crossed levers A A connected together in the manner of a pair of scissors by a vertical bolt B passed through them and into the perch C on which they turn in opening and closing for the purpose of acting against the wheels to retard the same, and again relieving them. These levers are halved and put together in the manner represented in Fig. 1. They are of equal length but they are so arranged in relation the one to the other as to make the distance from the central bolt on which they turn to the end to which the rubber is attached greater than to the opposite end, or in other words the distance from the central bolt B to the rubbers D is equal and likewise from said central bolt to the ends to which the spring is connected is equal. The long arms of the crossed levers to which the rubbers are attached are moved toward the wheel by means of bell cranks E connected to said crossed levers by screw rods F and to the central connecting rod G by the branch rods G' G² and to the spring H by horizontal rods I placed parallel to the perch C and extending to the short ends, A' of the cross levers to which they are attached and by bolts K passed through the bell cranks and said parallel rods I and on which bolts the bell crank turns.

The spring H is secured to the middle of the hind axle tree, or in any convenient place, by clips or staples, or other contrivances, and is designed principally for throwing the rubbers D from the wheels in ascending grades, or moving over level planes; and also for acting on the cross levers A in producing a combined action on the levers by the turning of the bell cranks by means of the rods I caused to operate by the descent of the carriage—the short sides of the bell cranks or L shaped levers acting on the long arms of the crossed levers and drawing the rubbers against the wheels, while the draft upon the pivots K of the bell cranks causes the connecting rods I of the spring and short ends of the levers and the rods F connected with the bell crank and long arms of the levers to move in contrary directions causing the spring and bell cranks to act simultaneously on the rubbers as the shortest sides of the bell cranks approach a parallelism with the parallel rods I as aforesaid, one rod of each bell crank acting upon the long arm of a lever whilst the other rod of the same side of the carriage acts upon the short arm of the other lever producing a combined action of the rubbers as above stated, and the compound action of the spring and L shaped levers upon the rubbers, which takes place when the short side of the L shaped levers and rods are all parallel.

The turning of the carriage is effected without interfering with the position of the rod G leading from the lever at the end of the pole to near the coupling bolt and from thence to the branch rods by having an oblong link formed in the main line of the rod at the coupling bolt of the fore axle tree through which the bolt passes and by which form of link the section of the rod beneath the perch and the section beneath the tongue are kept in a straight line, the sections of the rod forming an obtuse angle in turning; one side of the aforesaid link is lengthened whilst the other is shortened by connecting them to the corners of loose triangular plates L L to which the rods are connected, which plates by being connected to the rods and the sides of the said oblong links in the manner described allow the central rod to accommodate itself and preserve its central and proper position beneath the pole and perch of the carriage.

The link is composed of two parallel short rods M M arranged on either side of the coupling bolt connected at either end to corners of the triangular plates L. The ends of the central rods are likewise connected to corners of said triangular plates, as above stated, by which construction the central rod is made to accommodate itself to the changed position of the tongue in relation to the coupling pole or perch.

When the carriage is to be adapted to a single horse the tongue N and lever O and section $G^3$ of the connecting rod must be detached from the carriage, and a pair of shafts P substituted, such as that represented at Fig. 3 which is attached to one of the triangular plates L and to a cross bar Q to which a pair of parallel rods S are connected; and which rods are attached to the lower extremities of two short levers T turning on pivots inserted into the shafts P as their fulcra—the upper ends of said short levers being attached to the britching straps V of the horse.

When I desire to back the horses and carriage without operating the retarding apparatus as applied to wagons, I insert a key V through the tongue and lever to which the breast straps or chains are attached, which prevents the lever from turning.

The short ends of the levers E, may be segments or circles, as shown by the dots in Fig. 1 over which chains instead of the rods F are passed, connected with the short ends A', of the levers A; and the long ends of the lever E may be extended to or near the perch C in which case the pins or fulcra K of the levers must be inserted into the rods I nearer to the levers A' than in the former arrangement above described.

The levers T may be arranged on the outside or inside of the shafts as preferred.

Instead of the lever O at the end of the tongue there may be substituted a pulley and chain. And instead of using the bolt or pin V to stop the operation of the brake, a notched plate $a$ may be used, fastened to the hounds with which the connecting rod G is brought into contact by a lever connected to the rod G by a short vertical rod $b$, the lever $d$ being operated by the foot of the driver in order to lock the rod G to the notched plate by means of a knob $g$ on said connecting rod G which strikes against the plate $a$. The motion of the rod G being thus arrested the horses can back without bringing the rubbers against the wheels, and without inserting the aforesaid pin V through the tongue N and lever as aforesaid. I prefer this arrangement when the driver has his seat in the front of the carriage. See Figs. 5 and 6.

In plain wagons I make the crossed levers of two straight bars of wood $f f$ placed upon each other having the pin $p$ that connects them together passed through them in the manner represented in the drawing at Fig. 4, one arm of each lever being longer than the other on opposite sides.

What I claim as my invention and desire to secure by Letters Patent is—

1. The manner of retarding carriages in descending hills by the combination of the crossed levers A A, cranks E, parallel connecting rods I, springs H, arranged and operated in the manner and for the purpose above set forth.

2. I likewise claim making the rod to retain its central position beneath the pole or perch and tongue while turning the carriage in the manner described, by having an oblong link M formed in it at the coupling bolt in the manner above set forth by the combination of the triangular plates L and short rods M M.

CHRISTIAN STONER.

Witnesses:
WM. P. ELLIOT,
ALBERT E. H. JOHNSON.